United States Patent [19]

Kim

[11] Patent Number: 5,326,048

[45] Date of Patent: Jul. 5, 1994

[54] REEL SPRING OF VIDEO TAPE CASSETTE

[75] Inventor: Kichung Kim, Seoul, Rep. of Korea

[73] Assignee: Youngkwang Precision, Seoul, Rep. of Korea

[21] Appl. No.: 864,640

[22] Filed: Apr. 7, 1992

[30] Foreign Application Priority Data

Jan. 11, 1992 [KR] Rep. of Korea .................. 92-266

[51] Int. Cl.⁵ .......................................... G11B 23/087
[52] U.S. Cl. .................................. 242/343.2; 360/132
[58] Field of Search ............... 242/197, 198, 199, 200; 360/132

[56] References Cited

U.S. PATENT DOCUMENTS

| | | | |
|---|---|---|---|
| 3,739,998 | 6/1973 | Esashi et al. | 242/200 |
| 4,544,062 | 10/1985 | Maehara | 242/199 |
| 4,656,549 | 4/1987 | Schoettle et al. | 242/198 |
| 4,662,579 | 5/1987 | Gelardi et al. | 242/197 |
| 4,672,498 | 6/1987 | Harada | 242/198 |
| 4,770,367 | 9/1988 | Carroll | 242/199 |
| 4,826,097 | 5/1989 | Grant et al. | 242/200 |
| 4,899,243 | 2/1990 | Bordignon | 242/199 |
| 4,903,916 | 2/1990 | Carroll | 242/199 |
| 5,042,740 | 8/1991 | Schoettle et al. | 242/199 |
| 5,046,683 | 9/1991 | Carroll | 242/199 |
| 5,094,434 | 3/1992 | Ryu | 242/199 |

FOREIGN PATENT DOCUMENTS 0186180  10/1984  Japan .................. 242/199

Primary Examiner—Thomas B. Will

[57] ABSTRACT

There discloses a reel spring used in a magnetic tape of a video tape cassette comprising a base portion having apertures for installing a reel spring in an upper housing of a tape cassette and a pair of end portions extending at a certain angle to the plane of the base portion wherein first embossments are made longitudinally to improve a spring tension and second embossments are made to hold protruding pivots of tape reels between tips of the reel spring, spacing from the first embossments. The size of the second embossments is formed to be broad enough for the pivots' running smoothly and the second embossments project in a contrary direction to the bend of the end portions.

7 Claims, 3 Drawing Sheets

REEL SPRING OF VIDEO TAPE CASSETTE

BACKGROUND OF THE INVENTION (1) Field of the Invention

The present invention relates to a reel spring of a video tape cassette. In particular, the present invention relates to a reel spring having embossed guide grooves for supporting pivots of a tape reel, the guide grooves being formed formed on end portions of the reel spring without the increase in materials or decrease in tension whereby the pivots are not alienated from the end portion even though the width of a reel spring is narrow.

(2) Description of the Prior Art

A reel spring which is installed in an upper housing is a part for smoothing the drive of a reel by pressing the reel with a given resilience.

The technique relating to such a reel spring has been disclosed in U.S. Pat. No. 4,770,367 to William M. Carroll. This Patent is for a reel spring which has a substantially diamond-like configuration and provides a structure suitable for mass-producing and minimizing material loss.

In order to obtain the above object, the structure of this patent has the function of reel springs comprising an elongated strip of resilient material formed in a generally rectangular configuration. More particularly, this structure is achieved by a base portion having apertures for mounting the reel spring on an upper cassette housing; transition sections extending at a first angle to the plane of the base portion; and end portions extending at a second angle to the plane of the transition sections.

In such conventional spring, the end portions contacting protruding pivots of the reel are formed flatly, and the width of the end portions of the reel spring must be broad in order not to be alienated from the end portions when the pivots run. Otherwise at the time of the drive of the tape the pivots run and may be alienated from the end portions. Making the width of the end portions broadly enough to prevent the above problem causes a greater amount of material waste compared to a reel spring of an elongated strip having the same width, and therefore it is hard to reduce the manufacturing cost.

Another prior art technology for solving these problems is disclosed in Korean Publication No. 89-7595. The structure relating to end portions of the above conventional reel spring is shown in FIG. 6. A reel spring 4 shown in FIG. 6 has embossed guide grooves 6 on its end portions 5. The size of these embossed guide grooves 6 is formed to be substantially the same as that of the circumference of protruding pivots 3.

In consequence there is no space where the pivots 3 can run in the guide grooves 6, and when the reel 2 is driven, the pivots come to run into the inside wall of the guide grooves 6.

Accordingly an excessive force presses upon the drive of the tape and when high speed driving the pivots come into contact with one side of the guide grooves thereby causes a disadvantage that the pivots of plastics are deformed by friction.

SUMMARY OF THE INVENTION

An object of the present invention is to provide a reel spring having an improved structure by which pivots of tape reels are not alienated from end portions of the reel spring without the increase in materials or decrease in tension.

In order to obtain the above object, a reel spring of the present invention used in a magnetic tape of a video tape cassette comprises a base portion having apertures for installing a reel spring in an upper housing of a tape cassette and a pair of end portions extending at a certain angle to the plane of the base portion wherein first embossments are made longitudinally to improve a spring tension and second embossments are made to hold protruding pivots of tape reels between tips of the reel spring, spacing from the first embossments, the size of the second embossments is formed to be broad enough for the pivots' running smoothly.

DETAILED DESCRIPTION OF THE PREFERRED EMBODIMENTS

Figure 1:
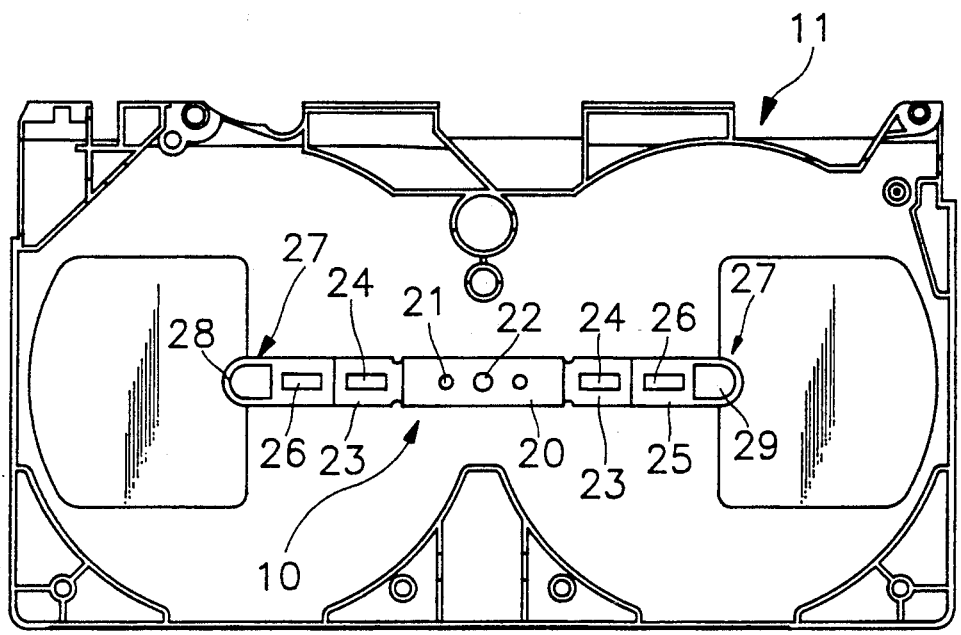
FIG. 1 is a schematic diagram of an upper cassette housing in which a reel spring of the present invention is installed.
Figure 2:
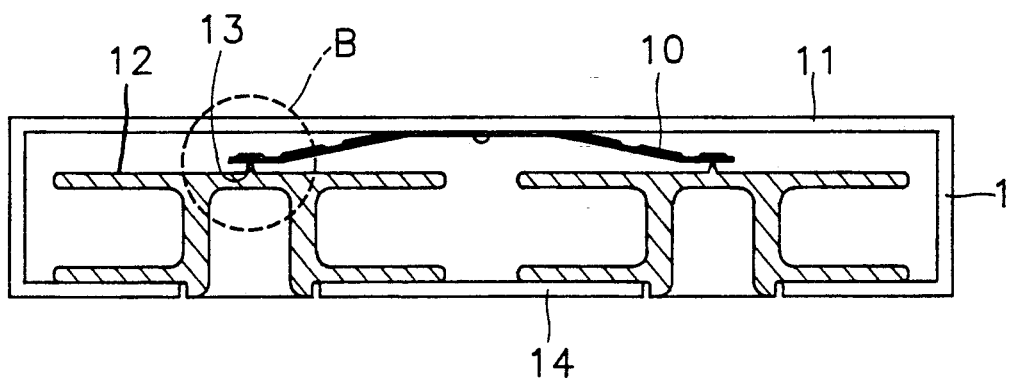
FIG. 2 is a sectional side view of a magnetic tape cassette on which the reel spring of the present invention is mounted.

Referring now to the drawings, FIG. 1 discloses an upper cassette housing of a magnetic tape cassette wherein a reel spring of the present invention is installed, and FIG. 2 shows a sectional side view of a magnetic tape cassette including a housing whose upper section is united with a lower one.

The cassette 1 includes an upper section 11 of the housing wherein a reel spring 10 is installed and a lower section 14 holding tape reels 12 on which a magnetic tape is wound and/or may be wound. The upper housing 11 includes transparent windows for viewing two tape reels 12 from the outside.

The cassette is a VHS type, and the tape reels 12 thereof are spaced from the upper cassette housing 11. Such a space is necessary to protect the tape reels 12 against any friction that may be generated when said reels 12 are driven, causing the tape reels 12 to move up and down.

The reel spring should have a certain resilience in order to alleviate the above-mentioned problem. A reel spring of a VHS cassette has a spring tension of 140 g to 190 g.

The reel spring according to the present invention will now be described in detail referring to FIGS. 3 and 4.

Figure 3:
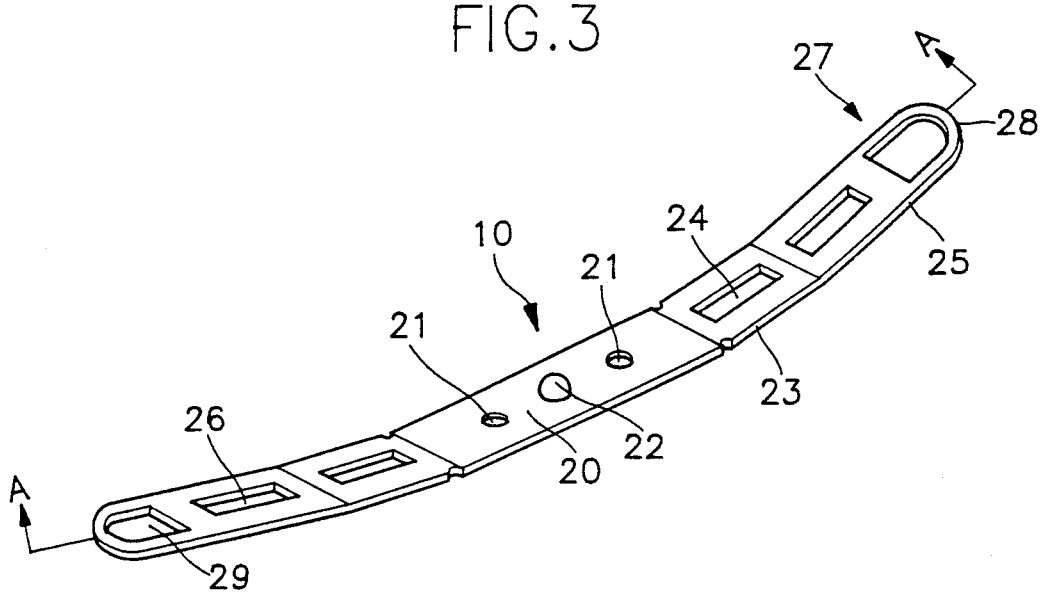
FIG. 3 is a perspective view of the reel spring according to the present invention.
Figure 4:
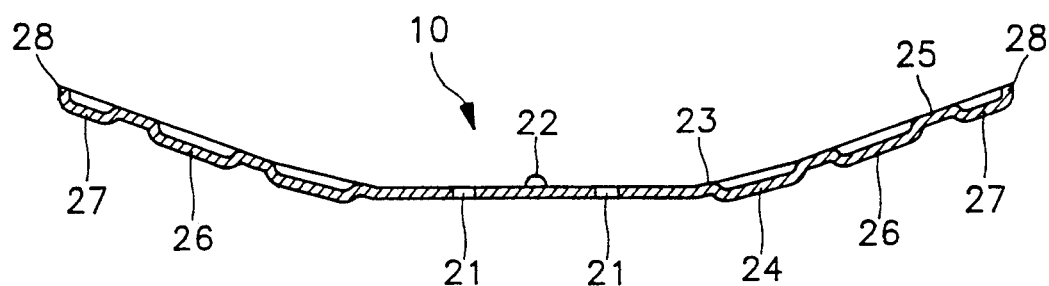
FIG. 4 is a sectional view as taken along lines A—A of the reel spring shown in FIG. 3.

FIG. 3 is a perspective view of the reel spring according to the present invention and FIG. 4 is a sectional view as taken along lines A—A of the reel spring shown in FIG. 3.

As shown in FIG. 3, the reel spring 10 comprises a base portion 20 having apertures 21 for installing a reel spring in an upper housing 11 of a tape cassette 1 and a projection 22 for keeping a space between a plurality of reel springs and each reel spring near thereto when the reel springs are stacked in an assembly machine and a pair of transition sections 23 extending at a first angle to the plain of the base portion wherein first embossments 24 are made to improve a tension of the reel spring 10 and a pair of end portions 25 extending at a second angle to the plane of the transition sections 23 wherein second embossments 26 are made to improve a spring tension. The first 24 and second 26 embossments may be together referred to as tension embossments.

The reel spring of the present embodiment is made of stainless steel and has a segmented arcuate-like configuration. While the projection projects toward the bend of the arm portion, the embossments are formed in a contrary direction to that of the bend of the arm portions. These are the factors required to get a reel spring have a satisfactory tension at a minimum of material.

In addition to the above structure the reel spring of the present invention has the third embossments 27, also known as receiving embossments, formed between the second embossments 26 and the rounded tips 28 in the same direction as that of the second embossments 24 and 26 in order to hold the protruding pivots 13 of the tape reels 12.

Figure 5:
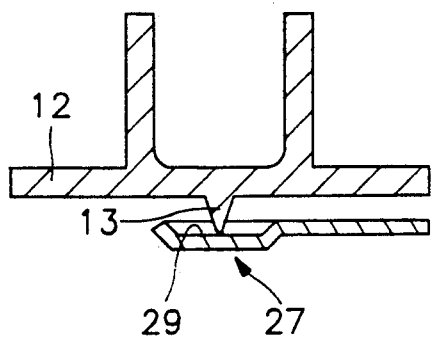
FIG. 5 is an enlarged view of a portion as identified by reference letter "B"
Figure 6:
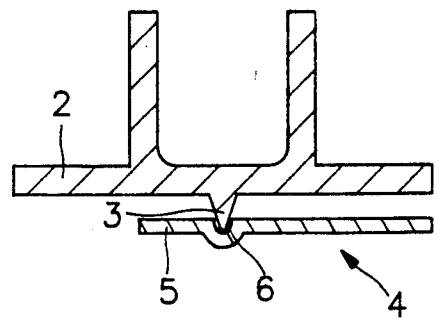
FIG. 6 is a sectional view of prior art reel spring of a video tape cassette having embossed guide grooves on conventional end portions, shown in conjunction with with pivots of tape reel.

The third embossments 27 serve as a guide groove in which the pivots 13 of the tape reels are held when the reel spring 10 is installed in the tape cassette 1 as shown in FIG. 5.

The third embossments 27 is substantially square, and the their sides towards the rounded tips 28 have a contour similar to the outline of the rounded tips. The tips may be at right angles with the both sides of the reel spring as well as being rounded.

The contour of the third embossments 27 that is formed according to the configuration of the tips or without reference thereto may be selected from among square and rectangular, square and rectangular whose edges are rounded, or rounded configuration.

The depth of the third embossments 27 must be shallower than the height of the protruding pivots 13. The width thereof is preferably broader than the widths of the first and the second embossments 24 and 26.

Bottoms 29 of the third embossments 27 that contact the pivots 13 of the tape reels 12 should be broad and flat in order to enable the above pivots 13 to run smoothly at the time of the drive of the tape as shown in FIG. 5.

As mentioned above, the pivots of the tape reels are held in the guide grooves having the suitable depth and width, and not alienated from the guide grooves of the reel spring such that the smooth drive is carried out, even if the pivots run at the time of the drive of the tape.

Further, even in the case where the tape is driven with high speed or in the reverse direction, the pivots come to run along the flat bottom within the guide grooves of the third embossments. Accordingly the pivots uniformly contact the bottoms thereof, which can prevent the pivots generally made of plastics from being damaged by friction.

In conventional reel springs, even though they have a satisfactory spring tension, there has been a limit to cutting down the width of the end portions because of the problem that the pivots of the tape reels are alienated from the reel spring. According to the present invention, however, it is possible to reduce the width of the reel spring without reference to the above problem thereby enhancing the competitiveness of manufactured goods.

The present invention is not limited to the above preferred embodiment, and the first and the second embossments 24 and 26 may be plural not singular or formed to project in a contrary direction to that of the bend of the arm portion.

Figure 7:
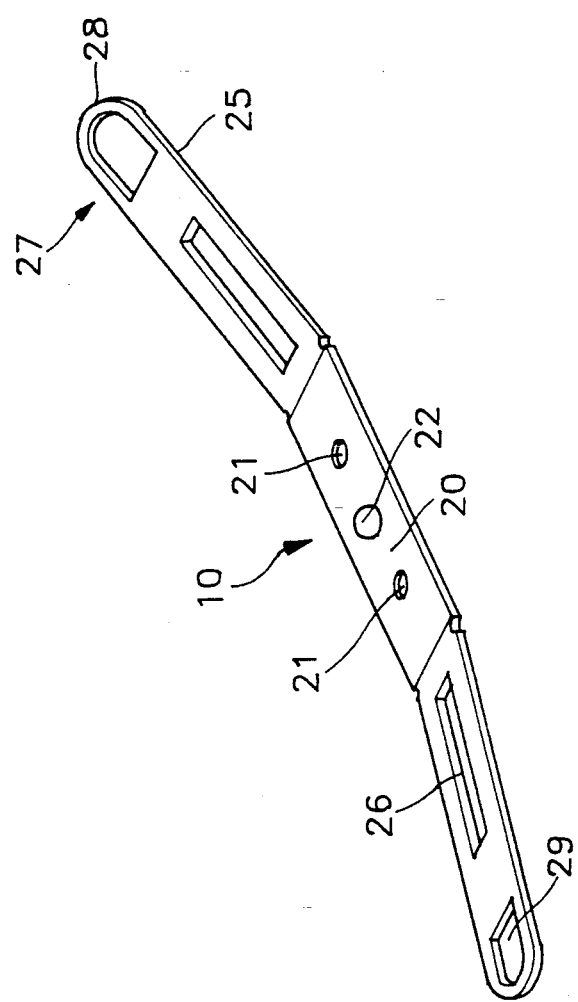
FIG. 7 is a perspective view of an alternative embodiment of the present invention.

Further in the above embodiment, embossments separated from each other are formed on the transition sections 23 and the end portions 25, and even if the embossments 26 are formed on the end portions without forming the transition sections 23 as shown in FIG. 7, no problem occurs when it comes to obtaining the object of the present invention.

What is claimed is:

1. In a magnetic tape cassette comprising two tape reels having protruding pivots, the pivots having a lateral portion and a contact point, and a base portion having apertures for installing a reel spring in an upper housing of the tape cassette, the reel spring comprising a pair of end portions extending at a certain angle to the plane of the base portion wherein tension embossments are made longitudinally to improve the spring tension and receiving embossments are made towards the tips of the spring for receiving the protruding pivots of the tape reels, the receiving embossments being spaced apart from said tension embossments, said receiving embossments having a flat bottom surface, said bottom surface being of sufficient breadth so as to retain the pivots via the contact point thereof without substantially contacting the lateral portion thereof, whereby friction is minimized and said tape reels can run freely, while the pivots are prevented from disengaging from the spring by edges of the receiving embossments.

2. The reel spring according to claim 1, wherein said receiving embossments are formed to project in a contrary direction to that of the bend of the end portions.

3. The reel spring according to claim 1, wherein the depth of the receiving embossments are shallower than the height of the protruding pivots.

4. The reel spring according to claim 1, wherein the contour of said receiving embossments is selected from among square and rectangular, square and rectangular whose edges are rounded, or rounded configuration.

5. The reel spring according to claim 1, wherein transition sections having additional tension embossments to improve the spring tension are further included between the base portion and the end portions.

6. The reel spring according to claim 1, wherein the contour of the tips of said end portions is rounded or rectangular.

7. The reel spring according to claim 1 whose right and left configuration is six, metrical toward the longitudinal centerline.

* * * * *